United States Patent
Shen et al.

(10) Patent No.: US 8,789,028 B2
(45) Date of Patent: Jul. 22, 2014

(54) MEMORY ACCESS MONITORING

(75) Inventors: Xiaowei Shen, Hopewell Junction, NY (US); Peter F. Sweeney, Spring Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 2048 days.

(21) Appl. No.: 11/478,743

(22) Filed: Jun. 30, 2006

(65) Prior Publication Data
US 2008/0034355 A1    Feb. 7, 2008

(51) Int. Cl.
*G06F 9/44* (2006.01)
*G06F 9/45* (2006.01)

(52) U.S. Cl.
USPC ............................................ 717/151; 717/127

(58) Field of Classification Search
None
See application file for complete search history.

(56) References Cited

U.S. PATENT DOCUMENTS

| | | | |
|---|---|---|---|
| 5,644,709 A * | 7/1997 | Austin | 714/53 |
| 6,351,845 B1 * | 2/2002 | Hinker et al. | 717/128 |
| 7,210,126 B2 * | 4/2007 | Ghobrial et al. | 717/127 |
| 7,996,671 B2 * | 8/2011 | Chheda et al. | 713/164 |
| 8,416,993 B2 * | 4/2013 | Springer et al. | 382/107 |
| 2003/0084266 A1 * | 5/2003 | Knippel et al. | 711/173 |
| 2004/0128661 A1 * | 7/2004 | Ghosh et al. | 717/159 |
| 2004/0199907 A1 * | 10/2004 | Motokawa et al. | 717/140 |
| 2004/0215880 A1 * | 10/2004 | Chilimbi et al. | 711/118 |
| 2007/0079298 A1 * | 4/2007 | Tian et al. | 717/140 |

* cited by examiner

*Primary Examiner* — Li B Zhen
*Assistant Examiner* — Evral Bodden
(74) *Attorney, Agent, or Firm* — F. Chau & Associates, LLC; Daniel P. Morris, Esq.

(57) ABSTRACT

A computer-implemented method for memory access monitoring, implemented by a managed runtime environment computer system including a controller that monitors application behavior and determines actions to be taken to change a behavior of an application, and a runtime, dynamic compiler that analyzes the application and generates code sequences to access a memory access monitoring (MAM) mechanism, includes determining monitor information of a plurality of fields of a memory block to drive an optimization of the application.

11 Claims, 3 Drawing Sheets

MEMORY ACCESS MONITORING

The U.S. Government has a paid-up license in this invention and the right in limited circumstances to require the patent owner to license others on reasonable terms as provided for by the terms of grant no. NBCH3039004, awarded by the Defense Advanced Research Projects Agency (DARPA).

BACKGROUND OF THE INVENTION

1. Technical Field

The present disclosure relates to memory access monitoring (MAM), and more particularly to a system and method for MAM implemented for reducing memory latency.

2. Description of Related Art

Compilers are typically used for optimizing software applications. Known optimization techniques include loop optimizations, inlining, software-pipelining, etc.

No known system or method implements MAM for such optimizations. Therefore, a need exists for a system and method for MAM implemented for reducing memory latency.

SUMMARY OF THE INVENTION

According to an embodiment of the present disclosure, a computer-implemented method for memory access monitoring, implemented by a managed runtime environment computer system including a controller that monitors application behavior and determines actions to be taken to change a behavior of an application, and a runtime, dynamic compiler that analyzes the application and generates code sequences to access a memory access monitoring (MAM) mechanism, includes determining monitor information of a plurality of fields of a memory block to drive an optimization of the application.

According to an embodiment of the present disclosure, a system for memory access monitoring (MAM) includes a MAM table, implemented in one of software stored on a computer-readable media and hardware, comprising an address register, a control register, and a monitor register, and a MAM mechanism operatively associated with a monitored memory block, wherein the MAM mechanism collects, in the monitor register, monitor information of the monitored memory block.

According to an embodiment of the present disclosure, a computer-implemented method of memory access monitoring includes collecting monitor information for a monitored address in a component in a memory hierarchy, and recording the monitor information for the monitored address, when at least one of, a sub-block of the monitored address is read, a sub-block of the monitored address is modified, and a sub-block of the monitored address is accessed.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Figure 1:
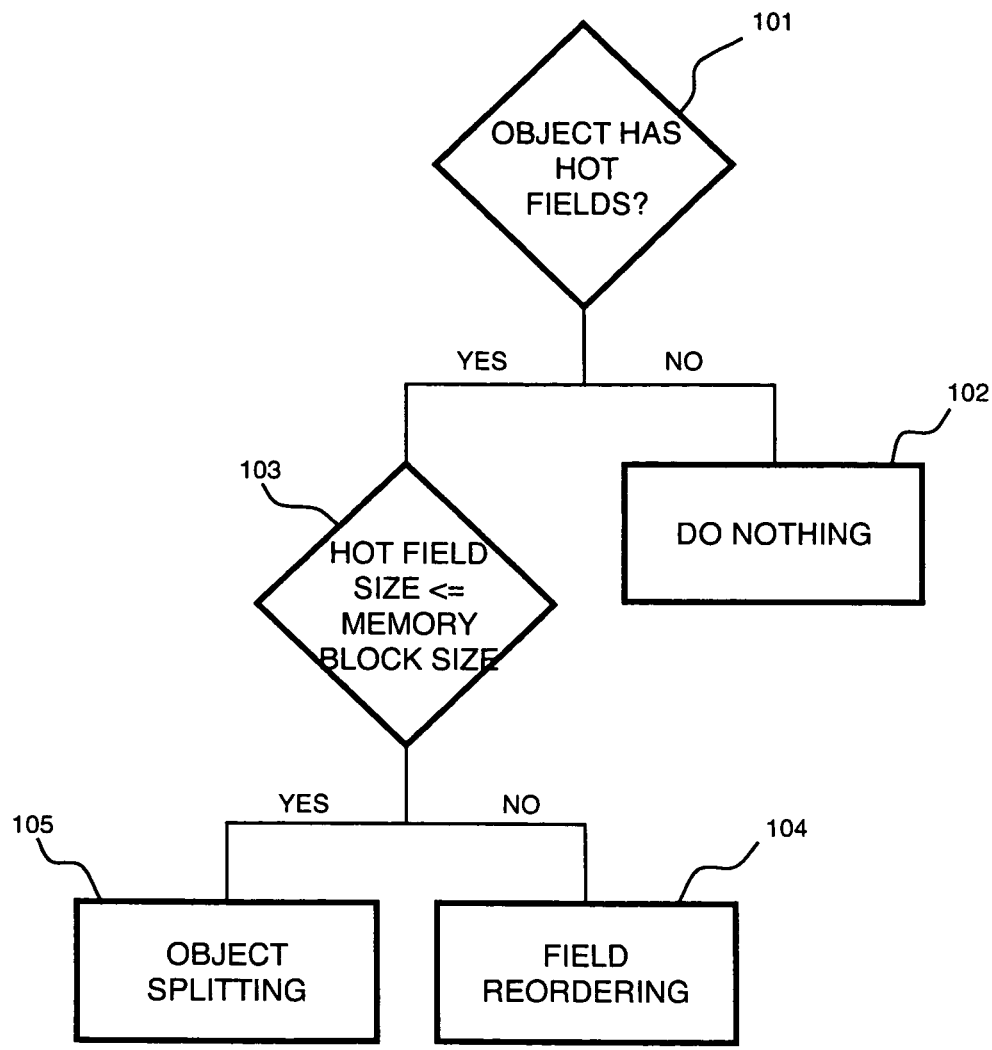
FIG. 1 is a flow chart of a method for determining an optimization to apply, according to an embodiment of the present disclosure.

A Memory Access Monitoring (MAM) mechanism monitors a memory block, and more particularly parts of a cache entry, that has been accessed by the program. MAM can be used by software to perform optimizations such as field reordering and object splitting. In multiprocessor systems, MAM can help software understand scenarios such as false sharing when read and write accesses are distinguished in the monitoring.

According to an embodiment of the present disclosure, software specifies a number of memory blocks that need to be monitored by the architecture. A memory block can be a cache entry, a memory page or an address range specified by software. The monitoring of a memory block is performed on the sub-block granularity, which can be a byte, word, double word, cache entry or whatever granularity chosen by the system. The MAM mechanism monitors which sub-blocks of a monitored memory block have been accessed since the monitoring starts.

For example, the apparatus may be comprised of a MAM table, where each table entry is further comprised of (i) an Address Register (AR) that records the address of a monitored memory block (ii) a Monitor Register (MR) that includes one bit for each sub-block in the memory block indicating whether the sub-block has been accessed, and (iii) a Control Register (CR) that determines what and where in the memory hierarchy to monitor. For example, what to monitor may be the reads to sub-blocks, or the modifies (writes) to sub-blocks. Where to monitor in the memory hierarchy may be a level and within a level a component. A component is a memory device or a cache. For example, where to monitor may be the second level in the memory hierarchy, or the level 2 (L2) cache. In a shared memory machine, there may be multiple L2 caches. In such a machine, specifying a component in the second level of the memory hierarchy would specify the specific L2 cache.

The level in the memory hierarchy that is being monitored determines the size of the memory block and sub-blocks that are monitored. For example, if an L1 data cache has a 32-byte cache line then the memory block size is 32 bytes and the sub-block size is a byte.

Either the software or the hardware specifies the address to be monitored by setting an AR and specifies where and what in the memory hierarchy to monitor by setting the corresponding CR, and at a later time, reads the corresponding MR to collect monitor information. A MAM mechanism may generate an interrupt when an event occurs; for example, a cache entry that is being monitored is replaced.

One who is skilled in the art will recognize that (a) a physical memory block address can have more than one virtual address associated with it and (b) in an implementation with virtually indexed physically tagged caches, each said address stored in AR is comprised of a physical or real address of a memory block.

When an address is written to an AR, it marks the beginning of the monitoring of the corresponding memory block. For example, a program can write directly into an AR. Alternatively, a program can use a separate instruction with an index to the MAM table to instruct the apparatus to start monitoring of the corresponding memory block. All MR bits are reset at the beginning of the monitoring. When the processor performs a memory access operation, it checks the MAM table to see if the memory block associated with the address is being monitored. If the corresponding AR is found in the table, the corresponding MR bits are set.

A MAM mechanism can monitor additional memory access related information. For example, each MR can maintain a counter for each sub-block to record how many times the sub-block has been accessed. The counter is set to zero at the beginning of the monitoring, and saturates when it reaches a predetermined maximal value. The counter could also be used to determine the order in which sub-blocks are accessed. The first time a sub-block is accessed, its counter is set to one and all other counters that have a value greater than zero are incremented. When the MR is read, any sub-block that has a zero value was never accessed, and the sub-block with the highest value was accessed first. Furthermore, MAM can distinguish read and write accesses in the memory access monitoring if necessary.

The address of the memory block kept in an AR is comprised of a virtual address of the memory block or a physical address of a memory block. For example, in a cache that is physically indexed and physically tagged, such as an L2 cache, the physical address of a memory block may need to be kept in an AR as part of the MR. In a cache that is virtually indexed physically tagged (e.g., an L1 cache), either the virtual address or the physical address of a memory block needs to be kept in an AR. Maintaining the physical address of a memory block together with the corresponding virtual address can be useful when dealing with aliasing of virtual addresses from address spaces of different applications.

The overhead to search the MAM table can be reduced with additional hardware. For example, the entry state in a cache can be extended with an extra bit to indicate whether a cache entry is being monitored. When a cache entry is to be accessed, if the cache entry state indicates that the cache entry is being monitored, the corresponding MAM table entry is updated; otherwise the MAM table is not accessed.

With architecture support, the MAM mechanism can monitor the monitor information for a set of memory blocks specified by software including, for example:

The sub-blocks that have been read.
The sub-blocks that have been modified.
The sub-blocks that have been accessed.
The number of times each sub-block has been read
The number of times each sub-block has been modified.
The number of times each sub-block has been accessed.
The sub-block that is read first.
The sub-block that is modified first.
The sub-block that is accessed first.
The order in which sub-blocks are read.
The order in which sub-blocks are modified.
The order in which sub-blocks are accessed.

For optimization via MAM-based profiling, software can use MAM to enable optimizations, including field reordering and object splitting. Field reordering is a technique that in an object's layout places hot fields together and cold fields together. A hot field is a field that is accessed often. A cold field is a field that is either never accessed or accessed infrequently while an application executes. Consider the example class definitions below:

```
Class A {
    field a1;
    field a2;
    ...
}
```

```
Class B inherits A {
    field b1;
    field b2;
    ...
}
```

In this example, an object of type class A has two fields, a1 and a2, and an object of type class B inherits the two fields from a sub-object of type class A and has two additional fields, b1 and b2. The layout of a B object would be:

| object header | a1 | a2 | B1 | b2 |

Memory increases from left to right. The first field is the object header, followed by instance variables of class A, and then followed by instance variables of class B. Assume that field a1 and b2 are hot. For purposes of this discussion, it may be assumed that the object header is always hot. Field reordering would like to layout a B object as:

| object header | a1 | b2 | A2 | b1 |

However, this layout breaks data encapsulation because an A object now contains the b2 field of the B class. An alternative bidirectional layout that does not break data encapsulation is:

| b1 | a2 | object header | A1 | b2 |

Field reordering is particularly appropriate if the object is larger than a memory block (e.g., a cache line), but the hot fields of the object will fit in a memory block. In particular, in a bi-directional layout, if the B object's header is aligned with the end of a cache entry, when a hot field is accessed none of the cold fields are brought into the memory hierarchy.

Another optimization technique is object splitting, which splits an object into multiple sub-objects so that all the cold fields are in one sub-object. After splitting, the hot fields are in another sub-object and the hot sub-object contains a pointer to the cold sub-object. Continuing with the previous example, a B object would be split where the hot sub-object is:

| cold pointer | object header | a1 | b2 |

And the cold sub-object is:

| a2 | b1 |

Notice that an additional cold pointer field is not needed for a B object as the B object can reuse the A object's cold pointer to access field b1.

Referring to FIG. 1, object splitting 105 may be used if the size of the hot fields is less than or equal to the size of a memory block 103. Object splitting 105 has the potential to allow more hot sub-objects to be placed on the same memory block then field reordering 104. Field reordering 104 may be used if the size of the hot fields is greater than the size of a memory block. Field reordering has the potential to allow all the hot fields of an object to fit on fewer cache entries then the original layout.

If an object does not include a hot field 101, no optimization is needed 102.

If cold and hot sub-objects are allocated from different memory regions, the program order of allocation can be relied upon to provide good locality while effectively increasing the size of a cache.

Furthermore, the order in which a cache entry's sub-blocks are accessed in a MAM mechanism can be used to determine the order of fields in the hot sub-object. For example, placing the field that is accessed first as the first field of the hot sub-object will reduce the cost of accessing other hot sub-object fields because all blocks of a cache entry are not filled simultaneously: cache entry blocks are filled in subsequent cycles. Ordering the hot sub-object fields by access order may result in further performance improvements. In addition, the number of times a cache line's sub-block is accessed can help to determine which fields are hot, which are warm, and which are cold. This is particularly important for field reordering when all the fields that are accessed do not fit into a cache line. The number of times a sub-block is accessed corresponds to the hotness of the sub-block, and hotness can be used to pick the hottest fields to fit in a cache entry.

Using software profiling to determine hot and cold fields in an object can be expensive. For software profiling, every field access bumps a counter. According to an embodiment of the present disclosure, MAM provides hardware support to determine the memory block utilization, which can be used to infer hot and cold fields to drive the field reordering and object splitting optimizations.

According to an embodiment of the present disclosure, a managed runtime environment (MRE) implements MAM-based profiling to effectively drive optimization.

An MRE, such as an adaptive optimization system (AOS) in a Java® virtual machine (JVM), can use MAM to implement optimizations that reduce memory latency. For purposes of the following exemplary embodiments, it is assumed that the MRE is comprised of (i) a controller that monitors application behavior and determines actions that should be taken to improve application behavior, and (ii) a runtime, dynamic compiler that analyzes a program and can generate the code sequences to access the MAM. Most implementations of micro architectures provide a mechanism to program hardware performance monitor (HPM) registers to either count how many times a particular hardware event occurs, or to sample the instruction and operand addresses that caused a HPM event to occur after the event has occurred some predefined number of times.

The MRE's controller uses hardware performance monitors (HPMs) to determine if access to data has a long latency and is impacting application performance. For purposes of this discussion, any data that is accessed by the program but is not in the L1 data cache is considered to have a long latency and to impact application performance. The controller can program the HPM's registers to count the number of accesses to the different components in the memory hierarchy and uses these counts to determine the overall latency of the application's execution. One who is skilled in the art can determine the latency to a component in the memory hierarchy from the number of accesses to that component multiplied by the time to access a piece of information in that component. An overall latency is a function of the amount of data that has to be accessed from the different levels of the memory hierarchy. Main memory and caches that are further away from a CPU take the longest to access.

If overall latency is sufficiently high, for example determined using a threshold, the controller programs the HPM registers to sample the instruction and operand addresses that cause an access in a particular component in the memory hierarchy. Initially, the controller might concentrate on L2 or L3 cache accesses as they are more expensive to satisfy than L1 cache accesses. A monitor candidate is the address of an instruction that has been sampled, and the number of times it has been sampled. The set of monitor candidates is sorted by the candidate's count. The monitor candidate with the highest count is considered first.

Figure 2:
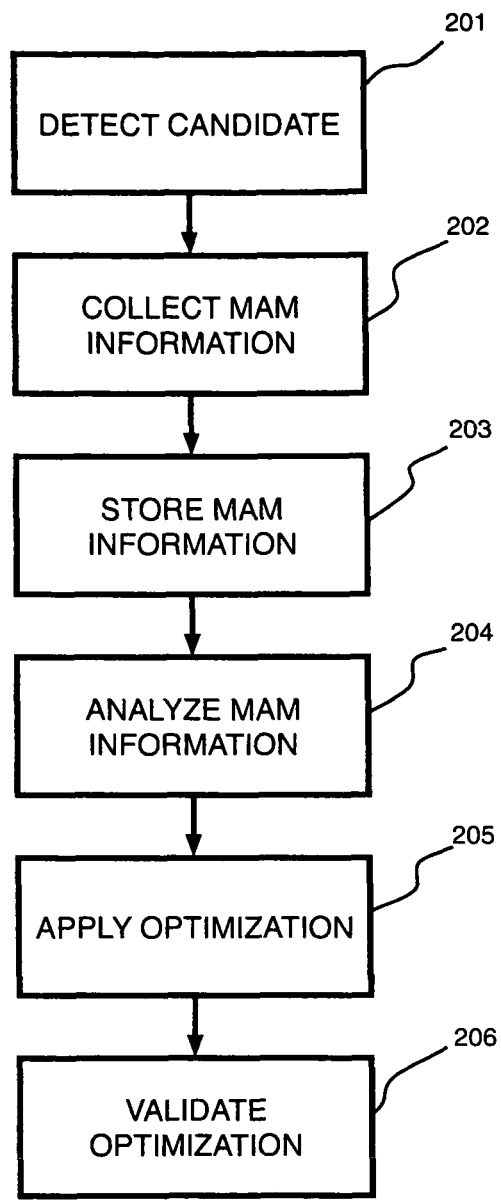
FIG. 2 is a flow chart of a method for driving an optimization, according to an embodiment of the present disclosure.

Referring to FIG. 2, once a monitor candidate has been identified 201, the controller, collects MAM data 202, analyzes the MAM data 204, applies an optimization 205, and validates the optimization 206. As shown the MAM data may be stored 203, e.g., on a computer readable media.

The controller uses the dynamic compiler to program the MAM. It is assumed that the instruction set architecture (ISA) has been extended to provide instructions to program the MAM. Given the instruction address from a monitor candidate, the dynamic compiler is used to identify the static type, T, of the object, O, that is being accessed at the instruction. One of ordinary skill in the art would recognize that the MAM registers could be programmed without modifying the ISA.

Static analysis in the dynamic compiler is used to determine a program point, P, which is the first time in a region of code that a field, F, in O is being accessed. Given P, the dynamic compiler can insert a sequence of instructions to compute, at run-time, the dynamic type, D, of O. D may be T or a subtype of T. Given D, F, and the address of F at P, the dynamic compiler can determine the starting address of O and load the object's address into an AR of a MAM table entry. If the object spans multiple memory blocks, multiple MAM table entries are used one for each memory block. For each MAM table entry whose AR is loaded with the memory block that is to be monitored and the table entry's CR is loaded with the component in the memory hierarchy that is to be. The sequence of instructions to program the MAM is inserted into the code region at P. For each MAM table entry that is programmed, the dynamic compiler inserts a call back to the controller passing the T, the object's static type, D, the object's dynamic type, P, a program point, the object's start address, the value of AR, and the value of CR.

Controller_MAM_start(type T, type D, i_addr P, object_addr startAddressOfObject, addr AR, int CR);

where "type" is an object type, "i_addr" is an instruction address, "object_addr" is an object address, and "addr" is a memory address.

At each exit program point of the code region, the dynamic compiler inserts a sequence of instructions to read the table entries of the MAM whose AR's were loaded and to invoke the controller passing P, the program point where the corresponding Controller_MAM_start callback was inserted, and the values of AR, CR and MR of the programmed MAM table entries.

Controller_MAM_stop(i_addr P, MAM_tableEntries [ ]entries);

where "MAM_tableEntries [ ]" is an array of MAM table entries.

A code region could be a function, a loop body, or the whole program.

After the dynamic compiler compiles the code region, the controller replaces the code region's old code with the newly compiled code region's code.

After a fixed number of times the controller is invoked by "Controller_MAM_stop", the controller replaces the candidate's instrumented code with the uninstrumented code and analyzes the collected MAM table entries.

Referring to FIG. 2, block 204, the MAM data is organized as follows: for each program point P where the compiler inserted instrumentation and a static type T, there will be a set of dynamic types where each dynamic type D will either be T or a subset of T. For each dynamic type there will be a set of information consisting of object address and one or more MAM table entries. A tuple specification of the MAM data that is generated from the callbacks to the controller is described below:

<P, T, <D, <object_addr, AR, MR, CR>+>+>

The "+" specifies that one or more instances of the tuple occurs. From this information, the controller can map the MR data back to fields in D, the dynamic type of T. The dynamic type determines where the object splitting or field reordering optimization should be applied in the class hierarchy as discussed with respect to FIG. 1.

Once an optimization has been identified (see FIG. 1) for type T, the controller needs to recompile all code that is affected by the optimization and all objects that include an instance of T need to be translated to the new storage layout for T (see FIG. 2, 205). In a language, like Java where data structures are location transparent, the translation to the new storage layout of all effected objects could be done in conjunction with a copying garbage collection. When an object that contains and instance of T is copied from one semi-space to another, the object could be translated to the new layout.

After field reordering or object splitting has been applied, overall latency is expected go down. The controller validates that overall latency goes down after an optimization (see FIG. 2, 206) has been applied by programming the HPM's registeres to count the number of accesses to different components in the memory hierarchy. Given the access counts to each component in the memory hierarchy before and after an optimization, the controller can determine if the optimization reduced overall latency. If overall latency does not decrease or does not decrease significantly after an optimization, for example as determined using a threshold, the optimization could be undone and a different optimization applied by considering a different monitor candidate.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 3:
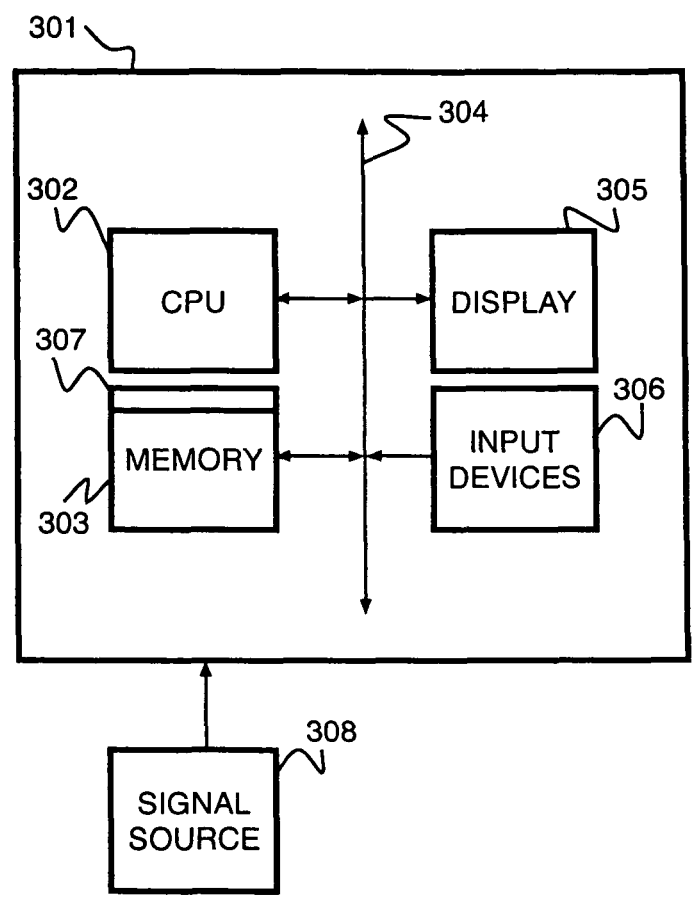
FIG. 3 is a diagram of a system according to an embodiment of the present disclosure.

Referring to FIG. 3, according to an embodiment of the present invention, a computer system 301 for implementing MAM for reducing memory latency can comprise, inter alia, a central processing unit (CPU) 302, a memory 303 and an input/output (I/O) interface 304. The computer system 301 is generally coupled through the I/O interface 304 to a display 305 and various input devices 306 such as a mouse and keyboard. The support circuits can include circuits such as cache, power supplies, clock circuits, and a communications bus. The memory 303 can include random access memory (RAM), read only memory (ROM), disk drive, tape drive, etc., or a combination thereof. The present invention can be implemented as a routine 307 that is stored in memory 303 and executed by the CPU 302 to process the signal from the signal source 308. As such, the computer system 301 is a general purpose computer system that becomes a specific purpose computer system when executing the routine 307 of the present invention.

The computer platform 301 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for a system and method for MAM implemented for reducing memory latency, it is noted that modifications and variations can be made by persons skilled in the art in light of the above teachings. It is therefore to be understood that changes may be made in embodiments of the present disclosure that are within the scope and spirit thereof.

What is claimed is:

1. A non-transitory computer readable storage medium embodying instructions executable by a processor to perform a computer-implemented method of memory access monitoring (MAM), the method comprising the steps of:

constructing a MAM table comprising a plurality of table entries, wherein each table entry comprises an address register (AR), a control register (CR), and a monitor register (MR);

identifying a memory block to be monitored, wherein an address of the memory block is specified by setting the AR and a location of the memory block in a memory hierarchy is specified by setting the CR, wherein the location is a memory component among a plurality of memory components having different latencies;

storing, in the MR, monitor information specifying which sub-blocks of the memory block have been accessed and how many times each sub-block has been accessed;

determining respective latencies for each memory component;

using one or more hardware performance monitors by counting a number of accesses for each memory component and multiplying the counted number of accesses by a time to access a piece of information, wherein memory latency is calculated in this manner for particular addresses within each memory component;

reducing the respective latency of the memory block by optimizing the memory block wherein an optimization includes field reordering and object splitting each applied according to a size of the memory block, wherein applying the optimization comprises: recompiling all code that is affected by the optimization; and reordering objects whose type has been optimized.

2. A computer-implemented method for memory access monitoring, implemented by a managed runtime environment computer system comprising a controller that monitors application behavior and determines an action to be taken to change a behavior of an application, and a runtime, dynamic compiler that analyzes the application and generates code sequences to access a memory access monitoring (MAM) mechanism, the computer-implemented method comprises determining monitor information of a plurality of fields of a memory block and a location of the memory block in a multi-level memory hierarchy to drive an optimization of the application, wherein the monitor information specifies which sub-blocks of the memory block have been accessed and how many times each sub-block has been accessed and the location is a memory component among a plurality of memory components having different latencies, and wherein the optimization reduces a respective latency of the memory block; and wherein respective latencies for each memory component are determined using one or more hardware performance monitors by counting a number of accesses for each memory component and multiplying the counted number of accesses by a time to access a piece of information, wherein memory latency is calculated in this manner for particular addresses within each memory component; and wherein applying the optimization comprises: recompiling all code that is affected by the optimization; and reordering objects whose type has been optimized.

3. The computer-implemented method of claim 2, wherein determining the monitor information comprises at least one of:

determining an address of a sub-block in the monitored memory block that has been read;
determining an address of a sub-block in the monitored memory block that has been modified;
determining an address of a sub-block in the monitored memory block that has been accessed;
determining a number of times a sub-block in the monitored memory block has been read;
determining a number of times a sub-block in the monitored memory block has been modified;
determining a number of times a sub-block in the monitored memory block has been accessed;
determining an address of a sub-block in the monitored memory block that is read first;
determining an address of a sub-block in the monitored memory block that is modified first;
determining an address of a sub-block in the monitored memory block that is accessed first;
determining an order in which sub-blocks in the monitored memory block are read;
determining an order in which sub-blocks in the monitored memory block are modified; and
determining an order in which sub-blocks in the monitored memory block are accessed.

4. The computer-implemented method of claim 2, wherein the optimization includes at least one of field reordering and object splitting.

5. A non-transitory computer readable storage medium embodying instructions executable by a processor to perform a computer-implemented method of memory access monitoring (MAM), the method comprising the steps of:

collecting monitor information including a monitored address in a component and a location of the component in a multi-level memory hierarchy; wherein
the multi-level memory hierarchy comprises different components, including the component, wherein
the different components have different latencies wherein respective latencies for each memory component are determined using one or more hardware performance monitors by counting a number of accesses for each memory component and multiplying the counted number of accesses by a time to access a piece of information, wherein memory latency is calculated in this manner for particular addresses within each memory component; and recording the monitor information for the monitored address, when at least one of, a sub-block of the monitored address is read, a sub-block of the monitored address is modified, and a sub-block of the monitored address is accessed, wherein the monitor information for the monitored address in the component in the memory hierarchy is used to drive an optimization reducing a respective latency of the component;

wherein applying the optimization comprises: recompiling all code that is affected by the optimization; and reordering objects whose type has been optimized.

6. The computer readable storage medium of claim 5, wherein the optimization includes at least one of field reordering and object splitting, wherein the field reordering and the object splitting are applied according to a memory block size of the component.

7. The computer readable storage medium of claim 6, wherein driving the optimization comprises:

detecting a candidate program point to collect monitor information;
collecting MAM information for the candidate program point;
analyzing the MAM information;
applying the optimization; and
validating the optimization.

8. The computer readable storage medium of claim 7, wherein detecting the candidate program point comprises:

counting accesses to the component in the multi-level memory hierarchy;
determining that the component has an affect on the application's performance from counted accesses; and
sampling accesses to the component in the multi-level memory hierarchy; and
identifying from sampled accesses at a candidate program point.

9. The computer readable storage medium of claim 7, wherein collecting the MAM information comprises:

identifying a program point to program a MAM mechanism;
programming the MAM mechanism at the program point with the MAM information that comprises the monitored address, an action, and the component in the memory hierarchy; and
collecting the MAM information upon the action occurring on the monitored memory block in the component.

10. The computer readable storage medium of claim 7, wherein analyzing the MAM information comprises determining if the optimization will reduce latency for the candidate.

11. The computer readable storage medium of claim 7, wherein validating the optimization comprises:

counting access to the component in the multi-level memory hierarchy; and
determine that the component's latency has decreased.

* * * * *